Jan. 25, 1966 R. V. THOMAS 3,231,452
HONEYCOMB COREBOARD AND METHOD FOR MAKING SAME
Filed Dec. 12, 1961 5 Sheets-Sheet 1

INVENTOR.
RICHARD V. THOMAS
BY
Cushman, Darby & Cushman
ATTORNEYS

Jan. 25, 1966   R. V. THOMAS   3,231,452
HONEYCOMB COREBOARD AND METHOD FOR MAKING SAME
Filed Dec. 12, 1961   5 Sheets-Sheet 2
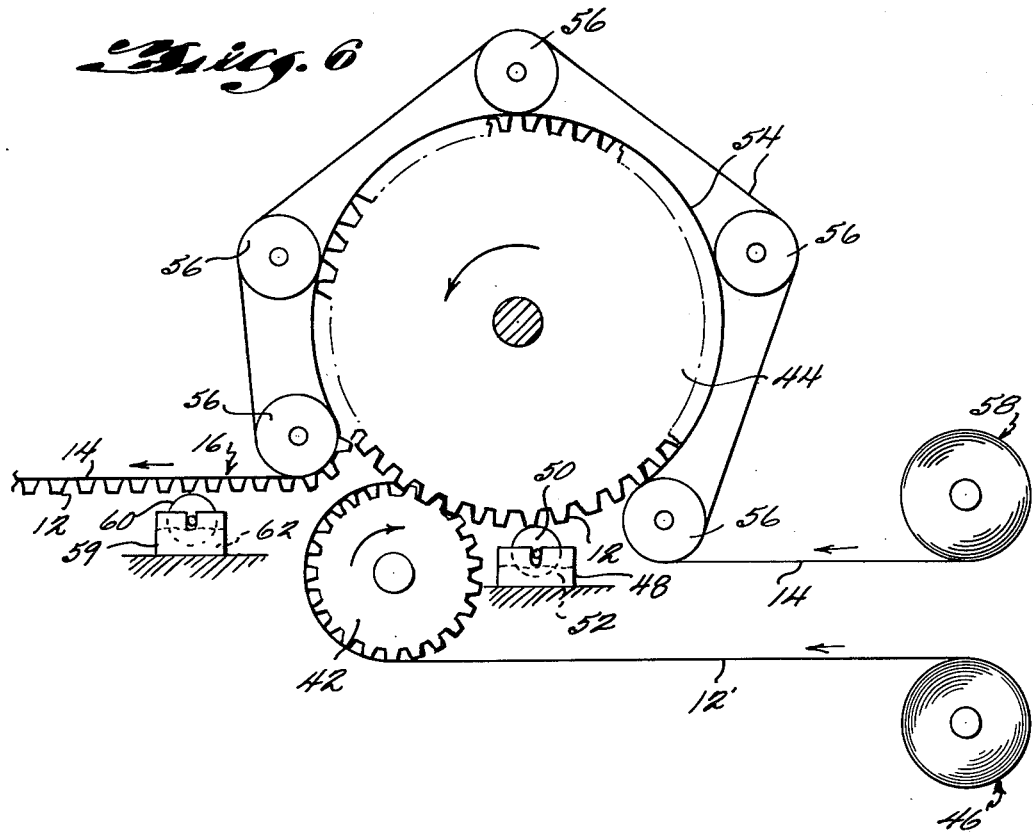
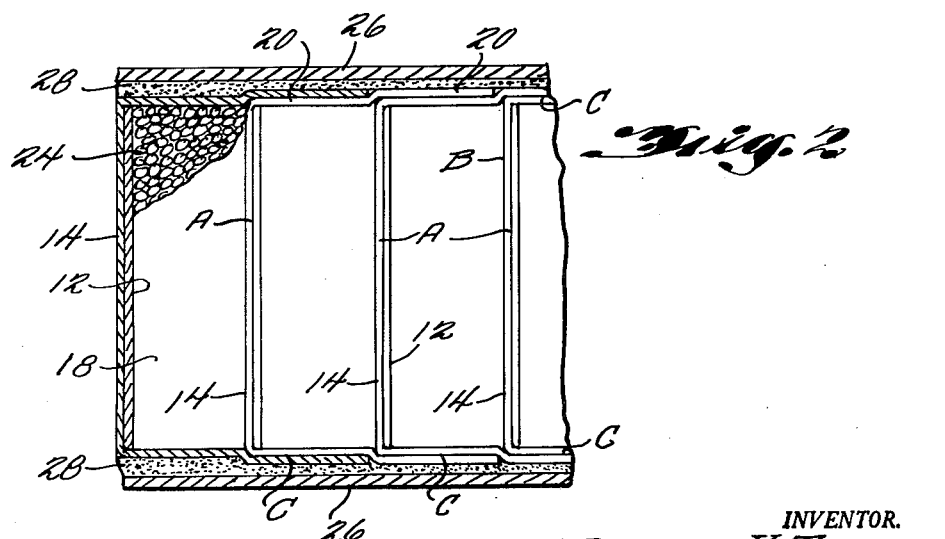
INVENTOR.
RICHARD V. THOMAS
BY
Cushman, Darby & Cushman
ATTORNEYS

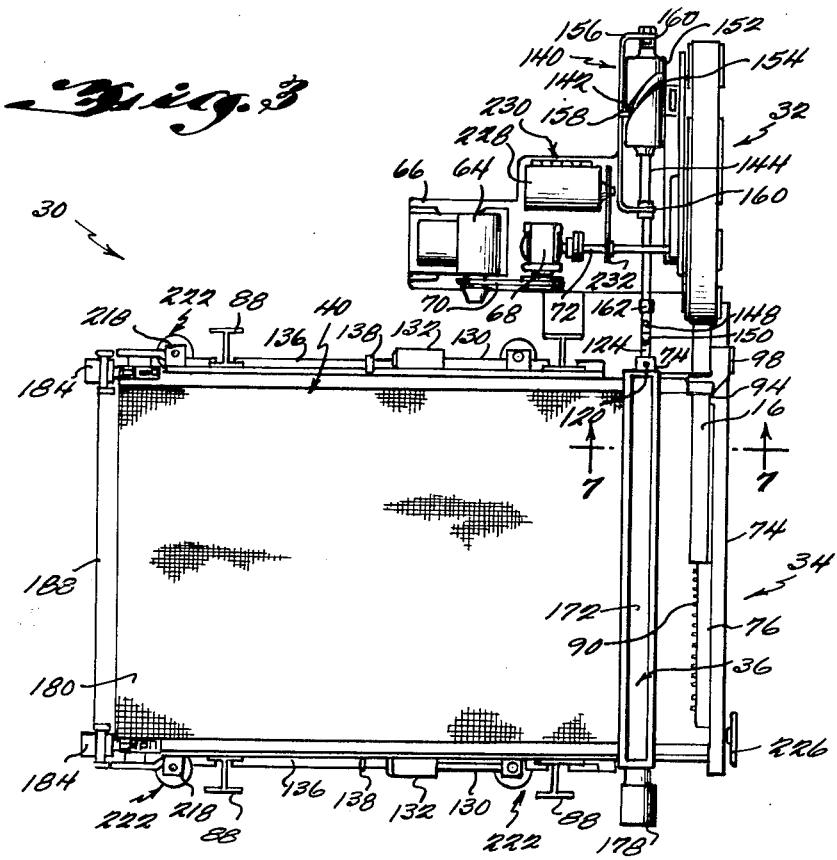
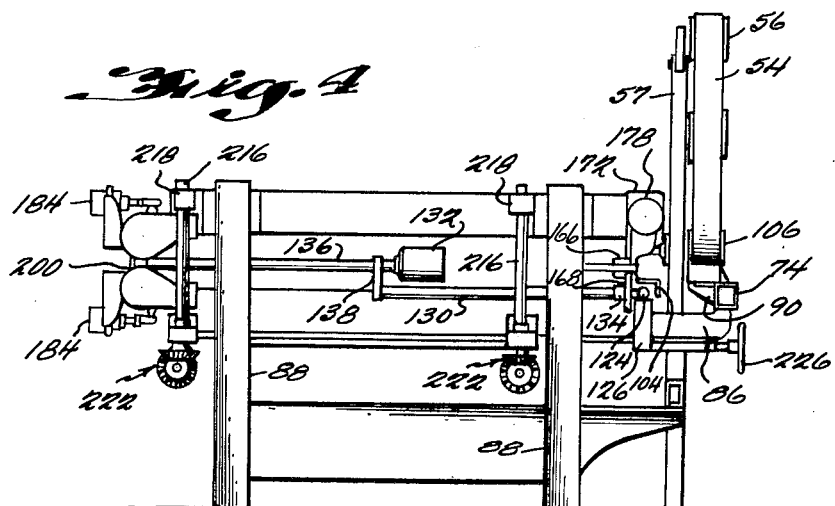

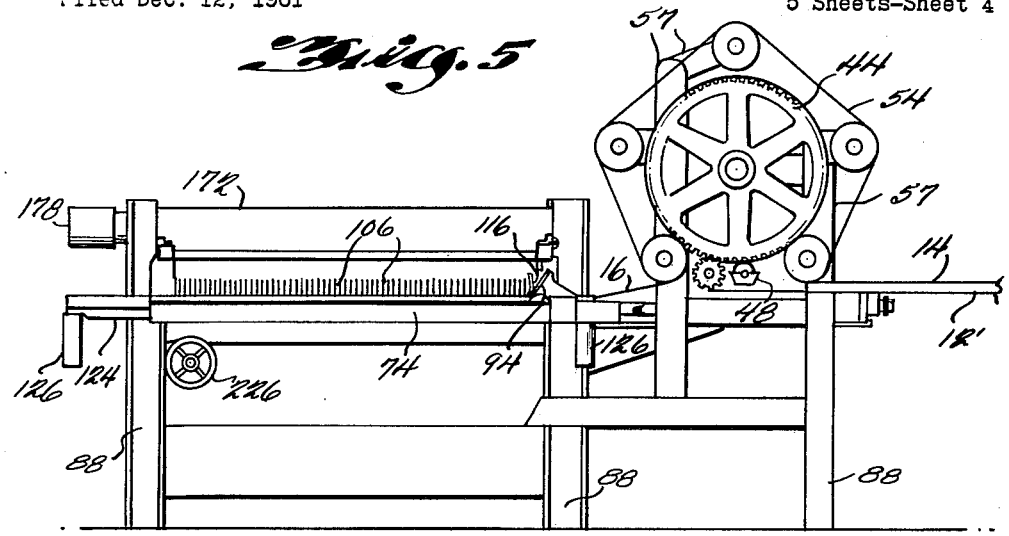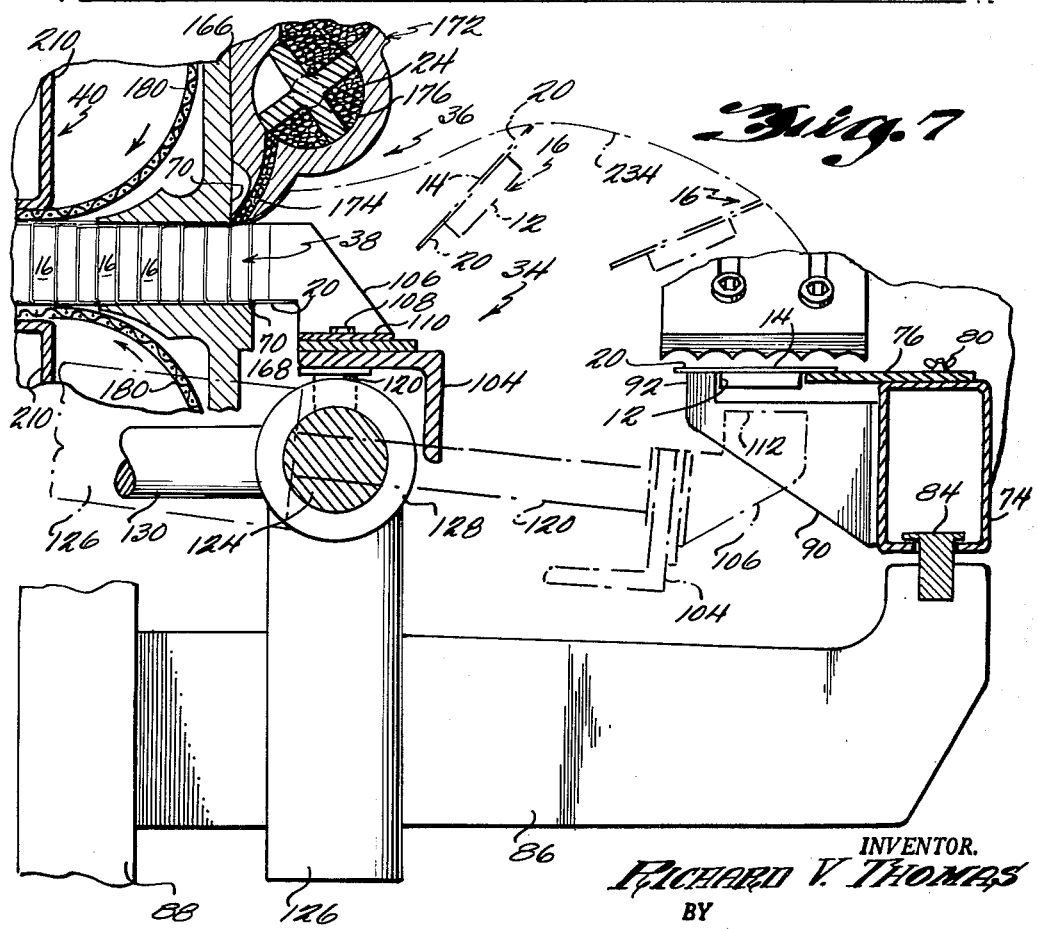

Jan. 25, 1966    R. V. THOMAS    3,231,452
HONEYCOMB COREBOARD AND METHOD FOR MAKING SAME
Filed Dec. 12, 1961    5 Sheets-Sheet 5

INVENTOR.
RICHARD V. THOMAS
BY
Cushman, Darby & Cushman
ATTORNEYS

United States Patent Office 3,231,452
Patented Jan. 25, 1966

3,231,452
HONEYCOMB COREBOARD AND METHOD FOR MAKING SAME
Richard V. Thomas, 2906 Ridgewood Ave., Alliance, Ohio
Filed Dec. 12, 1961, Ser. No. 158,755
21 Claims. (Cl. 161—68)

This invention relates to laminated cellular panels for use as structural material and, in particular, to an improved laminated cellular panel and to the method and apparatus for making same.

It is a primary object of the present invention to provide a new laminated cellular unit having greater strength and rigidity than prior laminated cellular units of similar materials of construction.

It is another object of the present invention to provide a new laminated cellular unit having flatter exterior surfaces than prior units.

It is a further object of the present invention to provide a new laminated cellular unit in which the exterior surface covering is integral with the core-forming structure whereby the unit has great strength and rigidity and whereby the surface covering is flat.

It is a further object to provide a new method of making a laminated cellular unit wherein corrugated strips of flexible material and relatively smooth strips of flexible material are formed into a composite unit having great strength and rigidity and flat exterior surfaces.

It is a further object to provide a method as above wherein a corrugated strip and a smooth strip are continuously bonded to each other to form a cellular tape wherein preselected lengths of said tape are sequentially and continuously cut from said tape and wherein said preselected lengths are sequentially and continuously bonded to each other to form the laminated cellular unit.

It is a still further object to provide a machine for performing the above novel methods having continuously operating corrugating and bonding means for forming a continuous cellular tape, cutting means for cutting said predetermined lengths from said continuous tape, conveyor means for sequentially conveying said lengths to a bonding station, and means for sequentially orienting and bonding said lengths into the completed unit.

Known laminated cellular units generally comprise at least three separate pieces bonded into a composite structure. Conventionally, one type of such structure includes an inner honeycomb-like member and two flat surface sheets bonded to opposite sides thereof transverse to the axis of the cells in the honeycomb thereby forming a sandwich type unit. Another conventional type includes a corrugated sheet of material having two surface sheets bonded to opposite sides thereof parallel to the axis of the cells formed by the flutes of the corrugated sheet. The materials of which the surface sheets and inner members are constructed, the bonding materials and the manner of forming the composite unit vary widely. Many types of fibrous sheet material, and resin-impregnated fibrous sheet material and metal sheet have been used. Bonding agents include water soluble adhesives, thermoplastic adhesives, and pressure activated adhesives. Apparatus for effecting the bond between the parts may include rollers, presses and various means for applying and activating the bonding agent. It is conventional also to fill the cells with lightweight insulating or strengthening material such as expanded plastic. Examples of prior laminated structure and the method and apparatus for making same are more fully disclosed in United States Patents Nos. 2,973,295, issued 1961; 2,744,042, issued 1956; 2,722,735, issued 1955; 2,547,880, issued 1951; and 2,102,937, issued 1937.

All of the cellular units formed by bonding one or more separate surface sheets to a preformed honeycomb or corrugated member suffer from the disadvantage that the area of contact between the surface sheet and the cell-forming member is relatively small. As a consequence, considerable difficulty has been experienced in obtaining a strong bond between the sheet and cell-forming member. Even when an effective bond is achieved initially, the sheets are susceptible to being pulled away from the cell-forming member because of the small area of contact between the two or because the surface layer of either element may separate from the remainder at the point of bonding, if such elements are constructed of fibrous material.

Another disadvantage associated with conventional cellular units is that the surfaces of large wall-sized units are often not flat due to warping of the cell-forming member and surface sheet during assembly of the unit. Thin-walled honeycomb material, being quite flexible, often gives a slightly wavy product when the surface sheets are bonded thereto by heat or pressure because the surface sheets do not have sufficient rigidity to overcome the flexibility of the honeycomb. Similarly, corrugated material is flexible parallel to the flutes and often produces a wavy-surfaced unit.

Conventionally, these units are formed into structural panels by bonding additional sheets of structural material such as aluminum to the exterior of the surface sheets. Due to the uneven surface of the units, incomplete contact and, accordingly, an inferior bond between the surface and the additional sheet results. In practice, it has been found desirable, if not necessary, to first bond a sheet of hard flat-surfaced fiber board to the surface of the unit and then to bond the final exterior sheet, such as an aluminum sheet, to the fiber board. When the fiber board is omitted, a poor bond between metal and cellular unit usually results and the structural unit is subject to being easily pulled apart when subjected to stress during use. Thus, a conventional structural panel which has a cellular unit for its core usually includes in addition to the cellular unit, two sheets of hard board and two exterior sheets of material such as aluminum.

The above-mentioned disadvantages of weak bonds and irregular surfaces are almost wholly overcome in the laminated cellular unit constructed in accordance with the present invention. The novel cellular unit avoids the problem of bonding a large flat sheet to a preformed honeycomb or corrugated sheet by being constructed so that the surface sheets are integral with the sheet material forming the cell walls. Broadly, this is accomplished by combining, in a particular manner, smaller cellular units which are of such a design that as each smaller unit is bonded to the others, a small portion of the final surface sheet is formed from a flap of one of the smaller units.

More particularly, the laminated cellular units of the present invention are constructed by transversely corrugating a strip of flexible material and bonding same to a relatively smooth, or flat strip of flexible material of greater width whereby the resulting tape has a corrugated surface and a smooth surface which together define a plurality of parallel, open-ended cells. The excess width of the smoother strip extends parallel to the axis of the cells in the form of a flexible flap.

Preselected lengths of this cellular tape are then arranged in parallel, opposed relationship, the smoother strip of one tape being placed in engagement with the corrugated surface of the adjacent strip. The flaps are then folded into engagement with the edge of an adjacent corrugated strip to close the ends of the cells and to form the surface sheet of the unit. Finally, the engaging surfaces between the tapes and between the flaps and cell ends are bonded together thus forming a laminated cellular unit in which each flap not only forms a portion of the surface covering of the unit but is integral with part of the cell-forming structure. Preferably, the corrugated sheet will have been centered on the wider smooth sheet so that each tape has a flap along each end. The completed unit will then be closed along both ends of the cells. Preferably, also, the width of each flap will be approximately twice the diameter of the cells so that when folded, each flap overlaps the adjacent flap, thus forming a two-ply surface covering which is bonded not only to the ends of the cells but also to the surface of the adjacent flap.

The improved bond between this flap-type surface covering and the cell structure over the conventional single large sheet bonded to a large preformed cell structure is readily apparent. In order to strip the present covering from the core, it is necessary not only to overcome the bond between the covering and the cell ends as in conventional units but it is also necessary to tear each flap from the remainder of the strip of which it is an integral part. In addition, the bond between the overlapping surfaces of adjacent flaps may also have to be broken, depending on the direction in which the stripping force is being applied. In actual stripping tests, it has been found that the cover can almost never be stripped as a single piece from the remainder of the unit because when one of the flaps tears or breaks away from its strip, usually only that flap is removed from the unit. That is, only a narrow portion of the cover defined by one or two flaps can be removed at a time because the covering tends to tear away from the unit in narrow strips rather than in the form of a single large sheet.

Another advantage of the novel cellular unit is its greater strength than that possessed by conventional units of the same size and material. The integral construction of covering and core strongly resists flexing in any dimension. In particular, the overlapping bonded flaps are very effective in resisting flexing longitudinally of the cells. While the construction of the present cellular unit, due to the overlapping strips which form the surface covers, requires somewhat more material for a given size and shape than does conventional construction, the improved strength of the new unit more than offsets the cost of the additional material.

Another advantage of the novel cellular unit of the present invention is its flat surface to which other materials, particularly light weight sheet metal, can be bonded easily. As pointed out above, conventional cellular units often have wavy or otherwise distorted surfaces as a result of flexing of the core and/or surface sheets during construction and such surfaces do not present an even, continuous area for bonding. The unit of the present invention, however, as a result of the manner in which it is constructed does not flex during the bonding steps and therefore presents a much flatter surface than conventional units. This advantage is particularly evident in forming a structural panel with the unit because it is possible to bond sheet metal directly to the unit thereby eliminating two layers of hardboard, one along each surface of the unit, and two layers of adhesive. The resulting structural panel is substantially as strong as the prior hardboard-containing panel but is constructed at considerable savings in materials.

The invention will be more fully understood from a reading of the following detailed description of a laminated cellular unit, its process of manufacture and an apparatus for carrying out the process, taken in conjunction with the drawings in which:

FIGURE 2 is an elevational sectional view of a laminated cellular panel, taken in a plane parallel to the cells and showing a sheet of metal bonded to a cellular unit;

FIGURE 3 is a top plan view of the machine for making the laminated cellular unit of FIGURE 1;

FIGURE 4 is a side elevational view of the machine;

FIGURE 5 is a front elevational view of the machine;

FIGURE 6 is a fragmentary view, on a slightly enlarged scale, of the cellular tape forming elements of the machine;

FIGURE 7 is an elevational sectional view, on a slightly enlarged scale, taken on the lines 7—7 of FIGURE 3;

Figure 1:
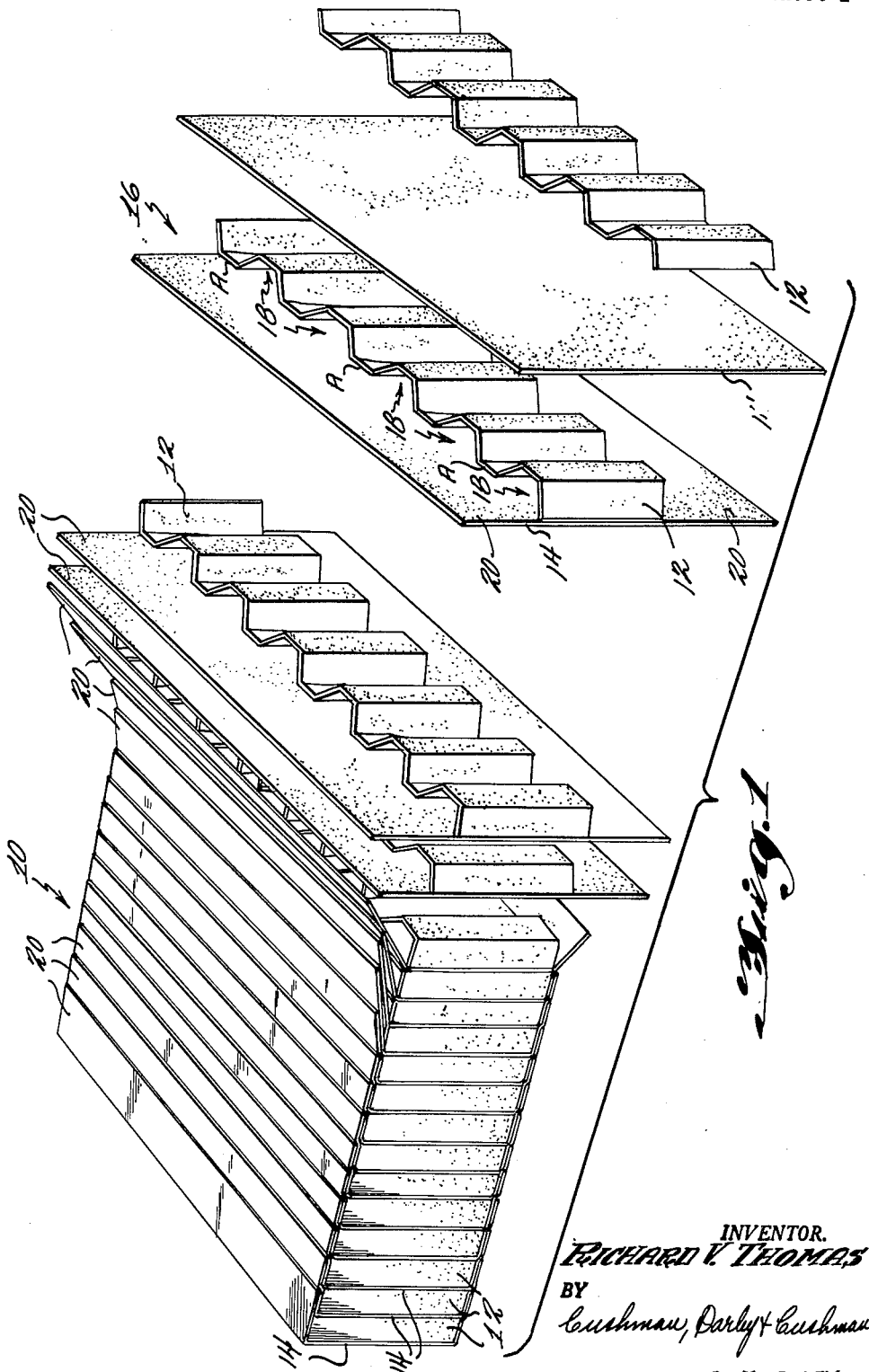
FIGURE 1 is a perspective view of a laminated cellular unit embodying the principles of the present invention and illustrating the basic steps in making same.

Referring to FIGURE 1, a laminated cellular unit 10 is illustrated in perspective together with individual strips of material which when bonded together form the unit. As seen at the right of FIGURE 1, a transversely corrugated strip 12 and a relatively smooth, or flat strip 14 when placed in parallel, opposed engagement and the engaging surfaces bonded together form a cellular tape 16 having a corrugated surface and a relatively smooth surface. More precisely, alternate flutes of the corrugated strip 12 are bonded to one surface of the relatively smooth strip 14, as at A, to form a plurality of spaced parallel cells 18 having open ends. The smooth strip 14, having a greater width than the corrugated strip 12, extends beyond the ends of the cells 18 in the form of flaps 20.

The laminated cellular unit 10 is constructed from a plurality of tapes 16 by placing the tapes in parallel opposed engagement and bonding the engaging surfaces together, i.e., by bonding the smooth surface of one tape, formed by a smooth strip 14, to the corrugated surface of another strip, formed by a corrugated strip 12. This bonded junction is illustrated at B in FIGURE 2. Each flap 20 is then folded into engagement with and bonded to the ends of its respective cells 18, that is, into engagement with the edge of the corrugated strip 12 of the same tape 16 so as to close the ends of the cells and form a relatively smooth, flat cover which is coextensive with the cellular unit 10 formed thereby. This bonded junction is illustrated at C in FIGURE 2.

As shown in FIGURE 1, and as the preferred embodiment, the width of each flap, that is, the distance between the edge of a corrugated strip 12 and a smooth strip 14, is about twice the diameter of the cells (plus the thickness of one corrugated strip) so that as the flaps are folded, they not only close the ends of the adjacent cells 18 but overlap and are bonded to the surface of adjacent flaps 20 so as to form a bonded two-ply cover over the unit 10. If desired, the smooth strips 14 may be selected of even greater widths so that the resulting flaps 20 will overlap more than one flap to produce a cover of more than two layers. The actual widths, lengths and thicknesses of the strips 12 and 14 and the dimension and spacing of the corrugations in strip 12 may be varied as necessary to produce a unit 10 of the desired thickness and width. The length of the unit 10 depends, of course, on the number of tapes 16 which are bonded together. Obviously, the wider the flaps 20 on strips 14 and the smaller and closer the corrugations in strip 12, the stronger and more rigid will be the final unit 10.

The materials of which the strips 12 and 14 are constructed may vary widely depending on the intended use of the product and include metal sheet and foil, thermoplastics, thermo-setting plastics, fibrous material such as paper, fabric and plastic-impregnated or plastic-coated fibrous materials and fabric. The relatively smooth strip 14 should be sufficiently flexible to allow the flap portions 20 to be folded and, conveniently, the material of which the corrugated strip 12 is constructed should be sufficiently flexible to be easily corrugated. However, it is contemplated that the corrugated strips may be rigid. In one preferred embodiment, both strips 12 and 14 are heavy paper, such as kraft paper, impregnated with a thermo-setting resin which is cured after the flaps 20 have been folded into place. The completed unit 10 is extremely strong, rigid, and tough.

The materials by which the strips 12 and 14 and the tapes 16 are bonded together may vary widely and include adhesive coatings on the strips and synthetic or natural adhesives applied to appropriate surfaces before bonding. The adhesive coatings on the strips are conveniently initially dry coatings which can be activated as desired by heat or liquids. When the strips 12 and 14 have been coated or impregnated with thermoplastics or thermosetting plastics, these latter materials may serve as a bonding agent when heat activated. If the strips 12 and 14 are metal, the bonding may be effected by spot welding.

While the laminated cellular unit 10 as described above may be used alone for many purposes, a preferred embodiment of the present invention contemplates the incorporation of an expanded plastic composition into the cells 18 to give the unit greater strength and rigidity at slight increase in weight. As a further embodiment, a unit 10 with or without plastic-filled cells has a surface sheet of metal, such as aluminum, bonded to one or both flat surfaces thereof to form a structural panel 22. These two modifications are illustrated in FIGURE 2 which is an elevational sectional view taken on a plane parallel to the longitudinal axis of a panel 22 and through a bonded junction A between strips 12 and 14. As shown therein, the cells 18 have been filled with expanded plastic polystyrene beads 24 and a surface sheet 26 of aluminum has been bonded to the exterior of the flaps 20 by means of a suitable bonding agent 28. The plastic for filling the cells is conveniently added to the cells before the flaps are folded and may be either expandable plastic beads or a foamable or otherwise expandable plastic composition such as those fully disclosed in U.S. Patents Nos. 2,806,812 and 2,973,295. After the flaps 20 have been folded, the plastic can be expanded by any suitable process. In the preferred embodiment, heat is applied to the unit to expand the polystyrene beads and simultaneously to cure the resin in the strips 12 and 14. The metal surface sheet 26 or other surface sheet may be bonded in any conventional manner as by the use of suitable bonding agents and the application of heat and pressure as desired.

It is apparent that the laminated cellular units 10 described above may be constructed in a variety of ways, it being necessary only to supply appropriate bonding materials to the junctions, A, B and C and to fold the flaps 20 into engagement with the cell ends and with adjacent flaps. The invention in its preferred form, however, contemplates a particular sequence of steps and a machine for carrying out the steps which produce a cellular unit of high uniform quality and low cost per unit length. FIGURES 3-9 illustrate a machine 30 and method which are eminently suited to the production of the units 10 of FIGURES 1 and 2.

As seen in FIGURES 3-9, the machine 30 includes a cellular tape-forming station 32 where strips 12 and 14 are bonded together, a tape-cutting and transferring station 34 for cutting and orienting lengths of tape 16, a cell-filling station 36, where the cells 18 are filled with heat-expandable plastic composition, a flap-folding station 38 and a heating station 40 to expand the plastic composition and to cure the resin impregnated in the strips.

The tape-forming station 32, as shown more in detail in FIGURES 5 and 6, includes a pair of rotatable, intermeshing gear wheels 42 and 44 between which a strip of flexible material 12' is fed continuously from a roll 46 thereof. The strip 12' in passing between the intermeshing teeth of the gears forms a transversely corrugated strip 12. Gears 42 and 44 may be electrically heated to activate an adhesive on the surface or impregnated in the strip 12' or, as shown, a solvent or adhesive box 48 and roller 50 may be positioned adjacent the gear 42 whereby the strip 12 in engaging the roller is coated with a suitable liquid adhesive 52 or with an activating liquid for a coating on the strip.

After passing between the gears 42 and 44 the corrugated strip 12 is maintained in contact with the periphery of large gear 44 by means of an endless fine-mesh belt 54 mounted on five freely rotating rollers or pulleys 56 which are held by suitable supports 57. Strip 14 of relatively smooth flexible material and of greater width than the corrugated strip 12 is drawn from a roll 58 between the endless belt 54 and corrugated strip whereby the two are held in contact while traveling with gear wheel 44. During this period the two strips become bonded together along their junctions A illustrated in FIGURE 1 to form the cellular tape 16. A second solvent or adhesive box 59 and roller 60 may be provided adjacent the corrugated surface of tape 16 as it leaves the gear 44 whereby alternate flutes are coated or activated by an appropriate liquid 62 in box 59. As pointed out above, gears 42 and 44 rotate continuously at a uniform rate and consequently tape 16 is formed continuously at a uniform rate.

As seen in FIGURE 3, the drive means for rotating the gears 42 and 44 may conveniently include an electric motor 64 suitably mounted on a support plate 66, a speed reduction unit 68 driven from the motor 64 by means of a belt 70 and suitable pulleys. The output shaft 72 of the reduction unit 68 aligns with the axle of the lower left pulley 56 of FIGURES 5 and 6 and may be connected thereto in any convenient manner.

Figure 8:
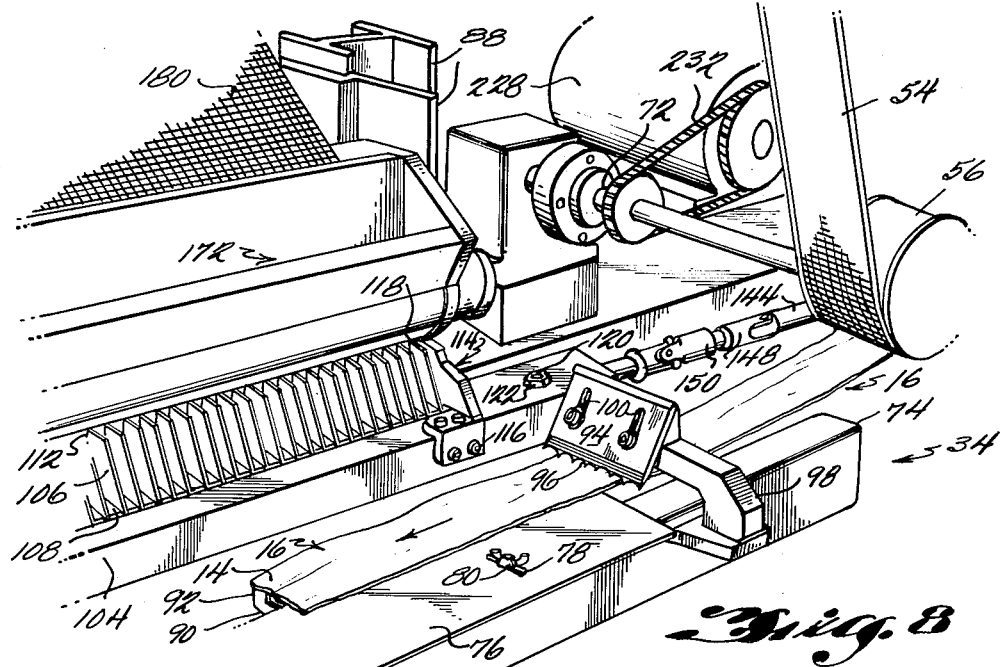
FIGURE 8 is a perspective view of the front end of the machine.

Adjacent the tape-forming station 32 and in a position to receive the tape 16 as it runs from between the belt 54 and the gear 44 is the cutting and transfer station 34. As seen in FIGURES 7 and 8, this station includes a hollow run-out bar 74 positioned horizontally and extending in the direction in which the tape 16 travels, that is, transverse to the axes of the gears 42 and 44. A flat run-out plate 76 is adjustably secured to the top of the run-out bar 74 by means of studs passing through slots 78 and wing nuts 80. A longitudinal slot 82 is provided in the bottom of the run-out bar 74 and a fixed rail 84 is provided for engaging the slot whereby the bar 74 is slidable along the rail 84 in the direction of tape travel. As shown in FIGURE 7, the rail 84 is secured to an arm 86 which in turn is secured to a frame member 88 of the machine. A plurality of thin, vertical, horizontally spaced finger members 90 are secured along one of their edges to one side of the run-out bar 74. As seen in FIGURE 7 each finger member has generally the shape of a right triangle with an upwardly projecting portion 92 at the apex which is remote from the run-out bar 74. The top of the portions 92 are level with and spaced from the top of run-out plate 76 whereby the tape 16 as it runs out is supported from below its flap portions 20 by finger portions 92 and run-out plate 76.

Also secured to the run-out bar 74 is a knife member 94 having a cutting edge 96 positioned above and parallel to the finger members 90. As shown in FIGURE 8 a support arm 98 is secured to the bar 74 and is provided with threaded studs which pass through slots 100 in the knife whereby the latter is adjustably secured to the arm 98 by means of nuts 102.

The transfer components of station 34 for lifting a length of tape from finger members 90 and run-out plate 76 include an elongated, movable transfer bar 104 having an axis parallel to that of the run-out bar and having secured thereto a plurality of thin, horizontally spaced transfer fingers 106. As seen in FIGURES 7 and 8 the transfer bar 104 is L-shaped in cross section, and the transfer fingers 106 are secured by means of bolts 108 along the upper flat surface of the bar. Each of the fingers 106 is a thin metal plate having a small flange 110 at a right angle thereto along its lower edge through which one of the bolts 108 passes for securing the flange to the transfer bar 104. The fingers are spaced from each other the same distance as the flutes of the tape 14 and extend outwardly from the transfer bar 104 where they terminate in a series of parallel, horizontally-spaced, tape-engaging edges 112 which are transverse to the transfer bar. A second knife member 114 is secured to the transfer bar next to the finger 106 nearest the tape forming station 32 by any suitable means such as bolts 116. The knife member extends outwardly of the transfer bar 104 and terminates in a cutting edge 118 parallel to tape-engaging edges 112 for engaging the tape and forcing the same against cutting edge 96 on the first knife member 94.

Transfer bar 104 is supported from below by a pair of piston rods 120, one of which passes upwardly through the bar at right angles thereto near each end of the bar. Each piston rod 120 is rigidly secured to the transfer bar 104, as by a pair of nuts 122 threadably engaging the rod and clamping the bar 104 between them. A transfer shaft 124 extends parallel to transfer bar 104 and is provided with a pair of transverse holes through which the piston rods 120 reciprocate. Each piston rod terminates in a piston (not shown) within an air cylinder 126 which is secured transversely to the transfer shaft 124.

The transfer shaft 124 is mounted for horizontal reciprocation and rotation within a pair of horizontally spaced sleeves 128 each of which is secured to the forward end of a rod 130 extending longitudinally of the machine 30. The rods 130 are mounted on opposite sides of the machine for longitudinal reciprocation by means of air cylinders 132 near their rear ends and sleeves 134 near their forward ends (FIGURE 4). The sleeves 134 and air cylinders 132 are secured to the frame of the machine in any suitable manner. The rear ends of the rods 130 are rigidly connected to piston rod 136 of the air cylinders 132 by means of connecting bars 138.

The transfer shaft 124 is further provided with a drive system 140, mounted on the support plate 66, for rotating the shaft approximately 90° about its own axis and for reciprocating the shaft transversely of the machine 30 in a horizontal plane. As seen in FIGURE 3 the elements of the drive system 140 for effecting reciprocal movement of the transfer shaft include a fixed main air cylinder 142 and a reciprocating piston rod 144 for connecting rod 144 with transfer shaft 124 through universal joints 148 and 150. The elements for effecting rotational movement of the transfer shaft include a sleeve 152 secured around the air cylinder 142 and having a spiral slot 154 therein and a yoke 156 having a cam 158 fixed thereto and riding in the slot 154. The yoke 156 spans the air cylinder and sleeve and is secured to the piston rod 144 as at 160 by any suitable means. As is apparent, linear movement of the piston rod under the action of the air cylinder also imparts a rotational movement to the transfer shaft 124 as a result of movement of cam 158 in slot 154. The universal joints 148 and 150 permit the transfer shaft to be moved longitudinally of the machine by means of the air cylinders 132 and shafts 130 described above.

As is apparent, the transfer bar 74 and its attached fingers 106 will move with the transfer shaft 124 and thus are movable transversely and longitudinally of the machine and rotatable about the axis of the transfer shaft. Yet another movement transverse to the transfer shaft 124 may be imparted to the transfer bar by means of the air cylinders 126 and piston rods 120. Thus, as seen in FIGURE 7, the transfer fingers are operable to lift a length of cellular tape 16 from the run out plate 76 and deposit it at the flap-folding station 38.

The run out bar 74 to which the run out plate 76 is attached is adapted for linear transverse movement simultaneously with movement of the transfer shaft by means of a suitable connection between the drive system 140 and the run out bar. As shown in FIGURE 3, a sleeve 162 is mounted on shaft 144 and has rigidly secured thereto an arm 164 which is rigidly secured to the run out bar 74 in any convenient manner. The sleeve 162 moves linearly with but does not rotate with shaft 144 as a result of any suitable connection between the two, such as a transverse keyway in the shaft and a key passing through the sleeve.

The flap folding station 38 includes stationary upper and lower folding plates 166 and 168, respectively, secured to the frame of the machine in any suitable manner and extending horizontally and transversely thereof. As seen in FIGURE 7, these plates are generally L-shaped in transverse cross section and are arranged with their foot portions parallel to each other so as to form a space for receiving the cellular tapes 16 deposited therein by transfer fingers 106. The plates are also arranged so that their angular portions form flap forming edges 170, the lower plate 168 being slightly forward of the upper plate 166. The lower flap 20 of the cellular tape 16 will therefore engage the lower folding edge 170 before the upper flap engages the upper folding edge.

Referring still to FIGURES 7 and 8, it is seen that the cell filling station 36 includes an elongated hopper 172 adjacent upper folding member 166 for holding expandible plastic beads 24 or other material to be placed in the cells of the tape 16 and an elongated discharge slot 174 in the bottom of the hopper. The hopper is mounted on the frame of the machine so as to be movable upwardly from its position as seen in FIGURE 7 whereby the upper flap 20 of each length of tape 16 can be engaged with the upper folding plate 166. When the hopper is in the FIGURE 7 position, the discharge slot 174 is substantially flush with the upper ends of the cells formed by two adjacent lengths of tape 16. A rotatable metering bar 176 positioned inside the hopper above discharge slot 174 for controlling the amount of material and the time of its delivery to the cells. As shown in FIGURE 3, an air cyinder 178 secured to an end of the hopper can be arranged to rotate the metering bar 176 through a predetermined arc to fill each set of cells as they are formed by sequential delivery of the lengths of tape 16 to the folding station 38.

Figure 9:
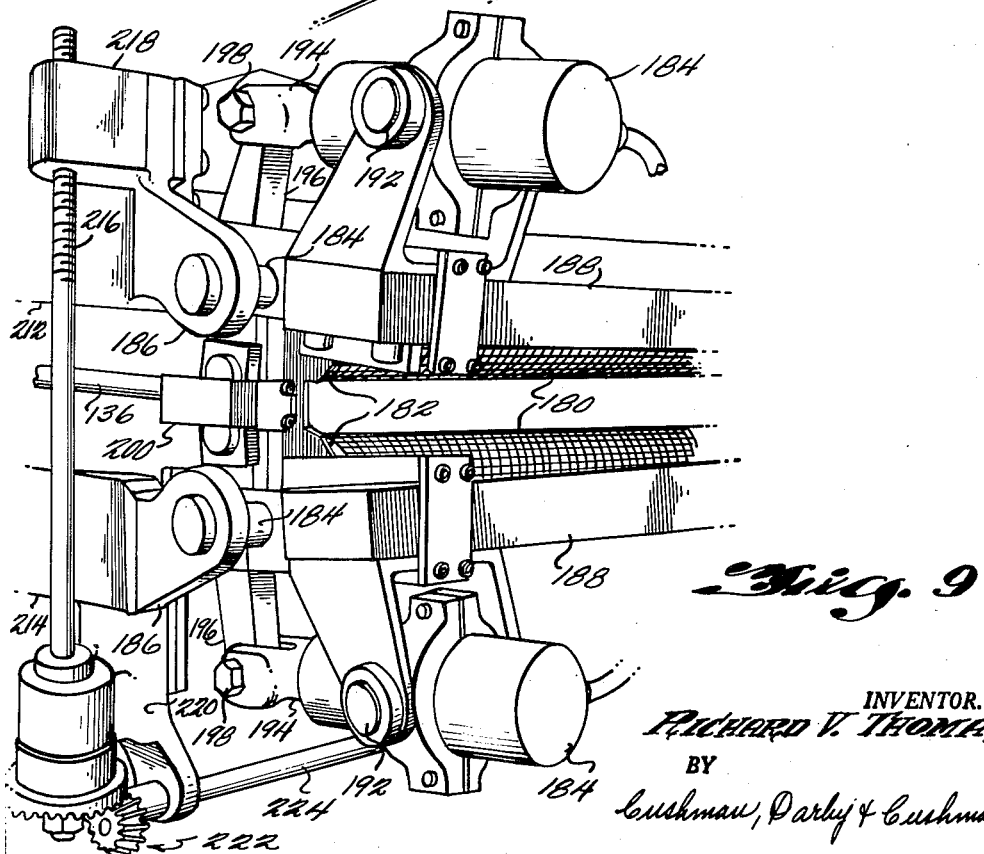
FIGURE 9 is a perspective view of the rear end of the machine.

Extending rearwardly of the folding plates 166 and 168 are a pair of vertically spaced, opposed endless mesh belts 180 for gripping and conveying the lengths of tape 16 rearwardly through the machine. Each belt is mounted on a pair of freely rotatable pulleys 182 mounted transversely to the machine at opposite ends thereof. As seen in FIGURE 9, the rear pulleys have axles 184 journaled in suitable fixed supports 186. The front pulleys are similarly supported. At the rear end of the machine upper and lower clamping bars 188 are mounted parellel to the upper and lower pulleys 182 and are operable by means of air cylinder 190 to clamp the belts 180 tightly to the rear pulleys. The air cylinders 190 are pivotally connected to the clamping bars 182 at 192 and have their piston rods 194 pivotally connected at 198 to fixed supports 196.

Intermittent movement of the belts 180 toward the rear of the machine is effected by means of the reciprocating shafts 136 which terminate in linkages 200 adjacent the ends of the rear pulleys 182. Linkages 200 cooperate with the pulleys by means of a ratchet-type action to rotate the pulleys through a predetermined arc when the shafts 136 move rearwardly.

As seen in FIGURE 7, a heating platen 210 is located within the loop of each belt 180 for the purpose of transmitting heat to the space between the belts, thereby to expand plastic beads 24 and to effect other reactions depending upon what materials are used in making the core board. Toward the rear of the machine, a cooling platen (not shown) is located within each loop to cool the core board before it is discharged from between the belts. As shown, heating platen 210 is a hollow, flat structure to the interior of which steam or other hot fluid may be delivered. The cooling platen may be of similar construction to receive a cooling fluid. Obviously, however, other means for heating and cooling the space between the belts 180 may be employed.

The upper platens and upper belt 180 together with upper fold plate 166 and other elements cooperating with the upper surface of the core board within the machine are vertically adjustable with respect to the corresponding lower elements in order that core board of different thicknesses may be made. Conveniently, the upper elements may be mounted on upper longitudinal frame members 212, as seen in FIGURE 9, which are supported from corresponding lower frame members 214, by means of a vertical, rotatable rod 216 near each corner of the machine. The upper end of each rod is threaded through a boss 218 on upper frame member 212 and the lower end of each rod is suitably supported by and journaled in a boss 220 on lower frame member 214. A suitable mitre gear arrangement 222 at the lower end of each rod is operable by a shaft 224 and hand wheel 226 (FIGURE 5) to rotate the rod and thereby raise or lower the upper frame member 212 and attached elements.

It will be understood that the various air cylinders described above are of the double acting type effecting positive movement of their rods in either direction and are provided with suitable air supply lines and pressure controls to produce the desired action. In order that the proper sequence of movement be achieved, a suitable synchronizing system will be incorporated to activate the air cylinders in the proper direction and at the proper time. Conveniently, such a system may take the form of a cam drum 228 (FIGURE 3), limit switches 230 and suitable solenoid valves (not shown) in the air lines to the air cylinders, the valves being operated by the limit switches. Cam drum 228 may conveniently be driven from main drive shaft 72 by a chain 232 and will thereby be driven at a rate proportional to the rate at which the cellular tape 16 is produced by the tape forming elements. Limit switches 230 and cam drum 228 will be arranged so that the number of revolutions of shaft 72 which produce a length of cellular tape 16 coextensive with the run-out bar 74 will effect a complete cycle of air cylinder movements.

Operation of the machine to form a continuous length of core board is as follows. As seen in FIGURES 5-8 and as described previously, the cellular tape 16 is produced continuously at a uniform rate and is fed from the tape forming elements onto run-out plate 76 and fingers 90 with its corrugated surface facing downwardly. During this period the transfer bar 104 is in the position shown in phantom lines in FIGURE 7 and fingers 106 thereon are intermeshed between fingers 90 on the run-out bar 74.

As the free end of the tape 16 approaches the end of the run-out bar 74 which is remote from the tape forming station 32, main air cylinder 142 is activated by interaction of cam drum 228 with the appropriate switch 232 to move its shaft 144 in the direction of tape travel. Simultaneously, run-out bar 74 and transfer bar 104 will be moved in the same direction as a result of their cooperation with shaft 144 and thereby will ride along with the moving tape 16. Additionally, transfer bar 104 will rotate counterclockwise as viewed in FIGURE 7 as a result of the action of cam 158 in slot 154 and consequent rotation of transfer shaft 124.

The linear and rotational movements of transfer bar 104 move the transfer fingers 106 between fingers 90 and into engagement with the indentations of the corrugated surface of tape 16 and thereby raise the tape away from run-out plate 76. Continued rotation of the transfer bar causes the moving tape to be sheared between knife members 94 and 114, which are also moving in the direction of tape travel. The resulting short lengths of tape continues to be transferred by fingers 106 and the free end of the continuous tape falls back upon fingers 90 and run-out plate 76.

Simultaneously, with the above described operation of the transfer bar 104, air cylinder 126 begins to retract its rod 120 so that the path of the short length of tape is that as shown by phantom lines 234 in FIGURE 7. At the end of their respective strokes, rod 120 and transfer shaft 124 effect the delivery of the cut length of tape into engagement with the previously cut length as seen in solid lines in FIGURE 7 and in FIGURE 8. The corrugated surface of the previously cut length, having been coated with adhesive or an activating liquid by solvent box 148, will thereby adhere to the smooth surface of the newly delivered length forming a plurality of cells between these surfaces.

As further seen in FIGURE 7, when the cells are formed as just described, hopper 172 is in a position such that its discharge slot 174 is flush with the tops of the newly formed cells. Clockwise rotation of the metering bar 174 through an arc of 90° then dumps a predetermined amount of plastic beads 24 or other material into the cells. The hopper is then moved upwardly away from the cells to permit the flap 20 on the last length of tape to remain in an upright position.

About this time that the cells are being formed as above described, air cylinders 184 are activated to clamp the clamping bars 188 against the belts 180. After the hopper 172 has filled the cells and moved upwardly, air cylinders 132 and consequently shafts 130 and 136 are activated to move the entire core board rearwardly the length of one cell diameter.

Rearward movement of shafts 136 cause the opposed surfaces of belts 180 to be moved rearwardly thus ejecting the core board from between the rear ends of the belts a distance of one cell diameter. Simultaneous rearward movement of shafts 130 cause fingers 106 to push the last delivered length of tape against the lower fold plate 168 thereby folding its lower flap 20 to substantially a right angle with the remainder of the length. The upper flap remains upright so that the discharge slot 174 of the hopper may be placed in communication with the cells to be next formed at the same time, the next-to-last length of tape is pushed completely between upper and lower folding plates 166 and 168 thereby folding the upper flap of that length into engagement with the top of the cells which have just been filled. Hopper 176 then moves downwardly so as to place discharge slot 174 against the edge of the corrugated portion of the last-delivered length.

Clamping bars 188 are then released from the belts 180 and air cylinders 132 are activated to move shafts 130 and 136 forwardly so that transfer fingers 106 move away from the last-delivered length of tape. Main air cylinder 142 and air cylinders 126 are then activated to return the transfer fingers to the phantom line position of FIGURE 7. Simultaneously, of course, the run-out bar 74 moves linearly with the transfer bar in a direction opposite to the direction of tape travel.

The cycle of movements just described is completed during the time that one length of tape is being fed onto run-out bar 74. Accordingly, as soon as the transfer fingers 106 reach the dotted line position of FIGURE 7, a new cycle is begun. Thus, it will be apparent that the core board is formed by increments of one cell diameter even though the tape 16 is produced continuously.

As the core board is inched along by belts 180 heat from platens 210 expands the plastic beads 24 so as to fill the cells. In the event that a heat activatable adhesive has been used to coat the surfaces of the tape 16, the bonding of the lengths into an integral unit will be effected during this time. Further, if the tape has been formed of resin-impregnated material, the resin will be cured during this time.

While preferred embodiments of the invention have been described, modifications thereof will be apparent to those skilled in the art and the illustrated details are not

What is claimed is:

1. A laminated cellular unit comprising: a plurality of parallel corrugated strips; a plurality of parallel relatively smooth strips having greater widths than said corrugated strips; said relatively smooth strips and said corrugated strips being arranged in contacting, alternating relationship with the flutes of each corrugated strip contacting a relatively smooth strip and forming a plurality of parallel cells, said relatively smooth strips forming flaps extending beyond one end of said cells, said flaps being folded into engagement with the edge of an adjacent corrugated strip and closing the cells formed by said adjacent strip and forming a relatively smooth flat covering transverse to said cells.

2. A laminated cellular unit as in claim 1 wherein said flaps have a width greater than the largest distance between adjacent smooth and corrugated strips, said folded flaps engaging the edge of an adjacent corrugated strip and overlapping at least one other flap.

3. A laminated cellular unit as in claim 1 wherein said flaps extend beyond both ends of said cells and are folded to form coverings over both ends of said cells.

4. A laminated cellular unit as in claim 1 wherein said strips are paper impregnated with a thermo-setting cured resin.

5. A laminated cellular unit as in claim 1 wherein said cells contain light-weight insulating material.

6. A laminated cellular unit as in claim 5 wherein said insulating material is a foamed resin.

7. A laminated cellular structural panel comprising: a plurality of parallel corrugated strips; a plurality of parallel relatively smooth strips having greater widths than said corrugated strips, said relatively smooth strips and said corrugated strips being arranged in contacting, alternating relationship with the flutes of each corrugated strip contacting and bonded to a relatively smooth strip to form a plurality of parallel cells, the edge portions of each relatively smooth strip projecting beyond the edges of said corrugated strips and forming a first flap extending continuously along the length of the strip adjacent one end of the adjoining cells and a second flap extending continuously along the length of the strip adjacent the other end of the adjoining cells, all of said flaps being folded in the same direction into engagement with the edge of an adjacent corrugated strip and into engagement with another flap, said folded flaps closing the ends of all said cells and forming two parallel relatively smooth coverings extending transversely to said cells; and a sheet of corrosion resistant metal bonded to at least one of said coverings.

8. A method of making a laminated cellular unit comprising: forming a length of cellular tape by transversely corrugating a strip of flexible material and bonding said corrugated strip to a relatively smooth strip of flexible material of greater width whereby said tape has a corrugated surface and a relatively smooth surface which together define a plurality of parallel open-ended cells and whereby the smooth surface extends outwardly of the edge of said corrugated strip in the form of a flap; arranging a plurality of such lengths of cellular tape in parallel opposed relationship, the relatively smooth surface of one length being in engagement with the corrugated surface of the adjacent length; folding said flaps into engagement with the edge of an adjacent corrugated length; and bonding said lengths and said flaps in position.

9. A method as in claim 8 in which the relative widths of each of said relatively smooth strips and said corrugated strip is such that said flap has a width greater than the distance between said lengths of tape, whereby when said flap is folded, it overlaps the flap on the adjacent tape.

10. A method as in claim 8 wherein said relatively smooth strip forms a flap adjacent each edge of said corrugated strip.

11. A method as in claim 8 further comprising filling said cells with light weight insulating material before the folding operation.

12. A method as in claim 11 wherein heat-expandable material is added to said cells before the folding operation and thereafter heated to expand said material.

13. A method of making a laminated cellular unit comprising: transversely corrugating at a uniform rate a longitudinally moving strip of flexible material; bonding the resulting corrugated strip to a longitudinally moving relatively smooth strip of greater width than said first-mentioned strip to form a longitudinally moving cellular tape having a corrugated surface, a relatively smooth surface and a flap projecting beyond the edge of said corrugated strip; periodically cutting preselected lengths from said moving cellular moving tape; arranging each length, as it is cut, in parallel, opposed relationship with the next previously cut length whereby the relatively smooth surface of one length engages the corrugated surface of an adjacent length; folding the flap of each length into engagement with the edge of an adjacent corrugated length; and bonding said lengths and said flaps in position.

14. A laminated cellular unit having a plurality of parallel honeycomb-like cells and a pair of generally flat coverings extending transversely to said cells and closing the ends of said cells, each of said coverings being of at least two-ply construction, said cells being formed by a large number of alternate flat strips and corrugated strips engaging and bonded to each other along the flutes of the corrugated material, each of said coverings being formed by edge portions of the flat strips which project beyond the edges of the corrugated strips and which are folded approximately 90° into contact with the edge of an adjacent corrugated strip and into overlying relationship with at least half of the edge portion of the next flat strip to thereby form at least two thicknesses of material in each covering, said two thicknesses being bonded together.

15. A method as in claim 9 wherein said corrugated strip is bonded to said smooth strip between the edges of the latter so as to form a cellular tape having two flaps each having a width greater than the distance between said lengths of tape.

16. A method for making a laminated cellular unit comprising: arranging a plurality of alternate strips of flat and corrugated material in contacting overlying relationship to form a plurality of open-ended parallel cells, said flat strips being of greater width than said corrugated strips and projecting longitudinally beyond at least one end of said cells in the form of flaps; folding said flaps into engagement with the edge of an adjacent corrugated strip; and bonding said strips and said flaps in place.

17. A method as in claim 16 wherein said flat strips project beyond the end of said cells a distance greater than the distance between said flat strips whereby when said flaps are folded they overlie at least a portion of the next flap.

18. A method as in claim 16 wherein said flat strips project beyond each end of said cells a distance greater than the distance between said flat strips and wherein the flaps at each end of the cells are folded into overlying engagement with other flaps.

19. A method as in claim 13 wherein the step of arranging said lengths of cellular tape includes moving each length, as it is cut, out of the plane of the longitudinally moving cellular tape and into said opposed relationship with the next previously cut length and wherein the folding step is carried out by intermittently moving said lengths between stationary, spaced apart plates in a direction transverse to said cells, the intermittent movement being effected each time a new length of tape is moved into said opposed relationship with the next previously cut length, 20. A method as in claim 19 wherein said strips are constructed of heat-curable, resin-impregnated material and wherein the bonding step includes holding said flaps in said folded position and heating said engaged lengths of tape to cure the resin.

21. A method as in claim 20 wherein a heat formable plastic material is introduced into the cells in each length of tape prior to said folding step and wherein said engaged lengths of tape are passed intermittently from between said plates into a heating zone for foaming said plastic material and for curing said resin.

References Cited by the Examiner

UNITED STATES PATENTS

| | | | |
|---|---|---|---|
| 1,121,817 | 12/1914 | Ferres | 156—470 |
| 1,158,667 | 11/1915 | Fairchild | 164—45.9 |
| 1,787,453 | 1/1931 | Murray | 161—135 |
| 2,537,026 | 1/1951 | Brugger | 156—470 |
| 2,609,315 | 9/1952 | Engel et al. | 156—210 |
| 2,744,042 | 5/1956 | Pace | 161—68 |
| 2,973,295 | 2/1961 | Rodgers | 154—45.9 |
| 3,066,722 | 12/1962 | Adams et al. | 156—470 |
| 3,070,475 | 12/1962 | Carlson et al. | 156—79 |
| 3,137,604 | 6/1964 | Bosch | 156—292 |

FOREIGN PATENTS 1,011,146  6/1952  France.

ALEXANDER WYMAN, *Primary Examiner.*

EARL M. BERGERT, DOUGLAS J. DRUMMOND,
*Examiners.*